US007102658B2

(12) United States Patent
Sanbongi et al.

(10) Patent No.: US 7,102,658 B2
(45) Date of Patent: Sep. 5, 2006

(54) PRINTING AND THERMAL ACTIVATION METHOD AND DEVICE FOR A HEAT-SENSITIVE ADHESIVE SHEET

(75) Inventors: Norimitsu Sanbongi, Chiba (JP); Minoru Hoshino, Chiba (JP); Tatsuya Obuchi, Chiba (JP); Yoshinori Sato, Chiba (JP)

(73) Assignee: Seiko Instruments Inc., (JP)

( * ) Notice: Subject to any disclaimer, the term of this patent is extended or adjusted under 35 U.S.C. 154(b) by 119 days.

(21) Appl. No.: 10/965,123

(22) Filed: Oct. 14, 2004

(65) Prior Publication Data

US 2006/0082638 A1 Apr. 20, 2006

(51) Int. Cl.
*B41J 2/315* (2006.01)
*G01D 15/10* (2006.01)

(52) U.S. Cl. ...................................... 347/171; 347/212

(58) Field of Classification Search ................ 347/171, 347/212, 218, 220, 221, 223; 400/120.01, 400/701; 156/DIG. 34, DIG. 36, 320, 322, 156/349, 384, 379.6, 387, 580, DIG. 21
See application file for complete search history.

(56) References Cited

U.S. PATENT DOCUMENTS 6,388,692 B1 * 5/2002 Iwata et al. ................. 347/212
6,850,262 B1 * 2/2005 Yoshida et al. ............. 347/171
6,877,917 B1 * 4/2005 Hoshino et al. ....... 400/120.01

* cited by examiner

*Primary Examiner*—K. Feggins
(74) *Attorney, Agent, or Firm*—Adams & Wilks

(57) ABSTRACT

Provided is a printing and thermal activation device for a heat-sensitive adhesive sheet that is compact, lightweight, and simple in structure. The heat-sensitive adhesive device for a heat-sensitive adhesive sheet includes a thermal head capable of printing on a printable layer and thermal activation for a heat-sensitive adhesive layer. When the heat-sensitive adhesive sheet is inserted, a platen roller and the thermal head are operated to transport the heat-sensitive adhesive sheet while printing on the printable layer. The heat-sensitive adhesive sheet is cut with a cutter unit at a predetermined position and then the cut sheet passes through a transporting roller pair and is guided to a reversing mechanism. The heat-sensitive adhesive sheet makes almost one rotation on an outer periphery of a reversing roller and is reversed, and then is transported by the transporting roller pair and the platen roller starting reverse rotation while the heat-sensitive adhesive layer is thermally activated with the thermal head.

12 Claims, 11 Drawing Sheets

FIG. 11A
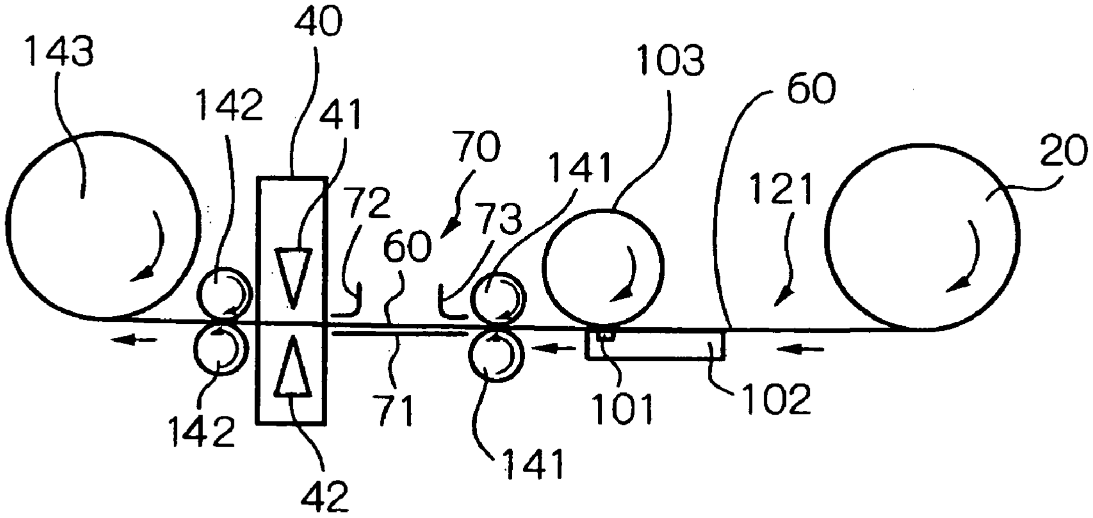
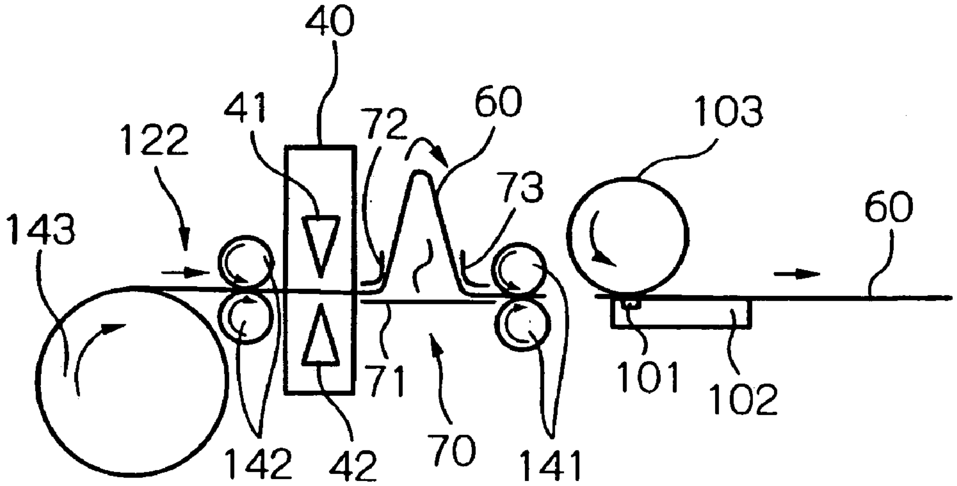
FIG. 11B

FIG. 14A FIG. 14B FIG. 14C
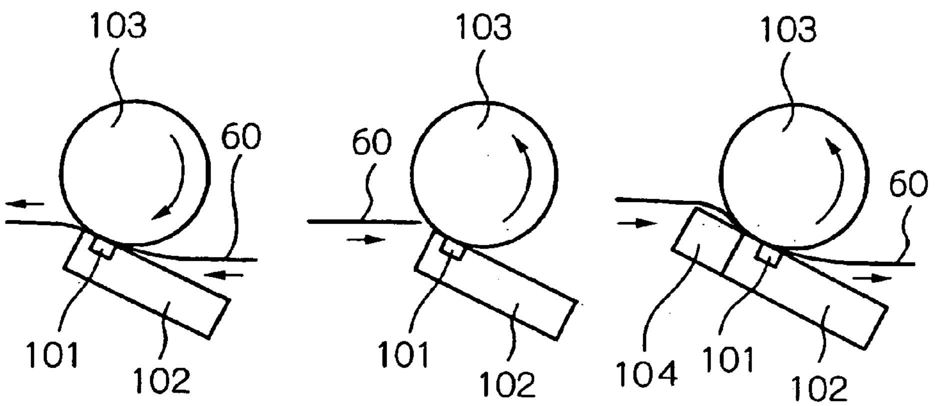
FIG. 15 PRIOR ARAT
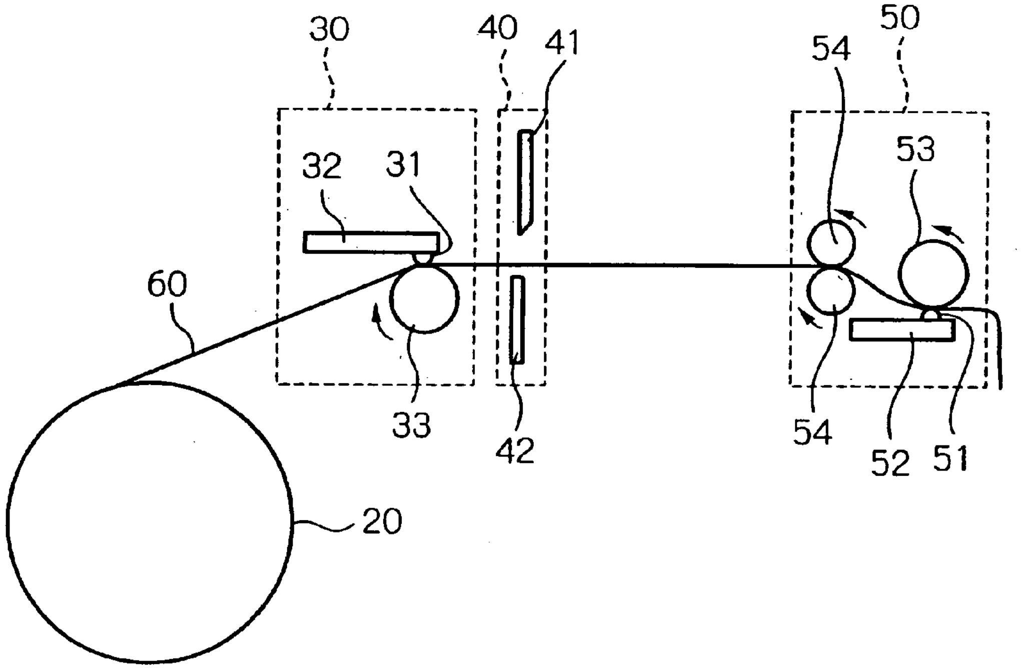

PRINTING AND THERMAL ACTIVATION METHOD AND DEVICE FOR A HEAT-SENSITIVE ADHESIVE SHEET

BACKGROUND OF THE INVENTION

1. Field of the Invention

The present invention relates to a printing and thermal activation method and device for a heat-sensitive adhesive sheet having a printable layer on one side and a heat-sensitive adhesive layer on the other side.

2. Description of the Related Art

In recent years, most of commonly used sticker labels as barcode labels or price stickers are such that a heat-sensitive adhesive layer is formed on an opposite side of a recording surface (printable layer) and release paper (separator) is stuck and temporarily bonded onto the heat-sensitive adhesive layer when in storage. However, this type of sticker label is disadvantageous in that the release paper needs to be peeled off from the heat-sensitive adhesive layer before use in label form, which inevitably involves wastes.

To cope with this, there have been developed as a release-paper-free system, a heat-sensitive adhesive label having a sheet-like base material on a rear side of which a heat-sensitive adhesive layer is formed, the layer exhibiting no adhesion in normal state but exhibiting the adhesion under heat, and a thermal activation device for heating the heat-sensitive adhesive layer formed on a rear surface of the heat-sensitive adhesive label to thereby bring out its adhesion.

For example, devices employing various heating systems such as a heating roll system, a hot air blower system, an infrared radiation system, and a system using an electro-thermal heater or induction coil have been proposed for the thermal activation device. For example, JP 11-079152 A ([0024] and [0025], FIGS. 1 and 2) discloses a technique for bringing a head having as a heat source plural resistors (heater elements) provided on a ceramic substrate into contact with a heat-sensitive adhesive label to heat a heat-sensitive adhesive layer like a thermal head used as a print head for a thermal printer.

Here, a typical structure of a conventional printer for a heat-sensitive adhesive sheet will be explained with reference to a thermal printer of FIG. 15.

The thermal printer of FIG. 15 is a printing and thermal activation device including: a roll housing unit 20 for holding a rolled heat-sensitive adhesive sheet 60; a printing unit 30 for printing on the heat-sensitive adhesive sheet 60; a cutter unit 40 for cutting the heat-sensitive adhesive sheet 60 into a label with a predetermined length; and a thermal activation unit 50 as a thermal activation device for thermally activating a heat-sensitive adhesive layer of the heat-sensitive adhesive sheet 60 in the form of a single cut label.

The heat-sensitive adhesive sheet 60 has a structure where a heat-insulating layer and a heat-sensitive color-developing layer (printable layer) are formed on a front side of a sheet base material and a heat-sensitive adhesive layer is formed on a rear side thereof by applying and drying a heat-sensitive adhesive, for example.

The printing unit 30 includes: a thermal print head 32 having plural heater elements 31 composed of relatively small resistors arranged in a width direction so as to enable dot printing; and a printing platen roller 33 brought into pressure contact with the thermal print head 32 (heater element 31). In FIG. 15, the printing platen roller 33 rotates clockwise, by which the heat-sensitive adhesive sheet 60 is transported from the left to the right in FIG. 15.

The cutter unit 40 is used for cutting into an appropriate length the heat-sensitive adhesive sheet 60 printed with the printing unit 30 and composed of a movable blade 41 operated by a drive source (not shown) such as an electric motor and a stationary blade 42 facing the movable blade 41, for example.

The thermal activation unit 50 includes: a thermal-activation thermal head 52 serving as heating means and provided with a heater element 51; a thermal activation platen roller 53 as transporting means for transporting the heat-sensitive adhesive sheet 60; and a draw-in roller 54 for drawing the label-like heat-sensitive adhesive sheet 60 fed from the printing unit 30 side in between the thermal-activation thermal head 52 (heater element 51) and the thermal activation platen roller 53. In FIG. 15, the thermal activation platen roller 53 rotates in a (counterclockwise) direction reverse to the rotation direction of the printing platen roller 33 to transport the label-like heat-sensitive adhesive sheet 60 in a predetermined direction (to the right).

Note that if the heat-sensitive adhesive sheet 60 irregularly sags when transported, wrinkles may develop on the sheet or any transport failure is more likely to occur. Hence, in general, a transport speed (print speed) of the printing platen roller 33 is matched with a transport speed (activation speed) of the thermal activation platen roller 53.

With the thermal printer thus structured, after the heat-sensitive adhesive sheet 60 exhibits adhesion, it is possible to label the heat-sensitive adhesive sheet as-is in the form of an indicator label, onto cardboard cartons, wrapping for foods, glass bottles, or plastic containers or in the form of a price sticker or advertisement label. Therefore, it is possible to dispense with the release paper used for conventional, typical sticker labels to realize cost reduction. Also, the label thus prepared is desirable from the viewpoint of recourse-saving and environmental protection on account of requiring no release paper that may end up in wastes after the use.

With the aforementioned conventional structure, the printing unit 30, the cutter unit 40, and the thermal activation unit 50 are arranged in line and require power sources for driving. The structure has a disadvantage that the entire device is large and cumbersome. In addition, such a structure requires transporting means for transporting the heat-sensitive adhesive sheet 60 while smoothly transferring the sheet among the printing unit 30, the cutter unit 40, and the thermal activation unit 50. Thus, a structure and control for the entire device are complicated when aiming at continuously and efficiently performing printing and thermal activation on the heat-sensitive adhesive sheet 60 while synchronizing the transport of the heat-sensitive adhesive sheet 60 with the transporting means with operations of the printing unit 30, the cutter unit 40, and the thermal activation unit 50. Further, an expensive thermal head is necessary for both the printing unit 30 and the thermal activation unit 50, leading to an increased cost of the entire device.

Also, the heat-sensitive adhesive layer of the heat-sensitive adhesive sheet 60 is thermally activated under heat in abutment with the surface of the thermal-activation thermal head 52 of the thermal activation unit 50 to exhibit adhesion. However, the heat-sensitive adhesive layer may adhere to the thermal-activation thermal head 52 due to its adhesion and slightly peel off from the base material and remain on the surface of the thermal-activation thermal head 52 as adhesive residues. As a result, a foreign matter as the adhesive residue exists between the thermal-activation thermal head 52 and the thermal activation platen roller 53, which lowers reliability of movement of the heat-sensitive adhesive sheet 60 from that point forward. There is a possibility that the smooth transport of the sheet cannot be maintained. To prevent this, it is necessary to clean the head at regular intervals.

The general heat-sensitive adhesive sheet 60 lacks in keeping the adhesion exhibited by thermal activation, and the strong adhesion can be only kept for about 1 minute. Thus, in the case of continuously performing printing and thermal activation on the heat-sensitive adhesive sheet 60 with the aforementioned conventional structure, a function of the adhesive sheet is lost unless labeling is completed in a short time. Accordingly, it is impossible to prepare a large amount of sticker labels in advance and collectively affix the labels later, i.e., so-called batch-labeling. This means that the sticker labels are produced one by one or in small amounts and successively affixed, imposing limitations on the application as the adhesive sheet.

SUMMARY OF THE INVENTION

The present invention therefore has an object to provide a printing and thermal activation device for a heat-sensitive adhesive sheet, which is compact, lightweight, and simple in structure as compared with conventional ones. Another object of the present invention is to provide a printing and thermal activation method and device for a heat-sensitive adhesive sheet, with which an adhesive residue is automatically cleaned off to keep movement property of the heat-sensitive adhesive sheet from being impaired and batch-labeling of the heat-sensitive adhesive sheets is realized.

A printing and thermal activation device for a heat-sensitive adhesive sheet according to the present invention includes a thermal head capable of printing on a printable layer constituting one surface of the heat-sensitive adhesive sheet by abutting against the printable layer and capable of thermal activation for a heat-sensitive adhesive layer constituting the other surface of the heat-sensitive adhesive sheet by abutting against the heat-sensitive adhesive layer. With this structure, it is unnecessary to separately provide a printing unit and a thermal activation unit, which makes the entire device compact and lightweight as well as reduces the number of expensive thermal heads, leading to cost reduction. Further, transporting means attains more simplified structure as the number of constituent units reduces. The control for synchronizing operations of each constituent unit and transporting means can be made simple as compared with conventional ones.

The thermal head may switch between a printing operation and a thermal activation operation for the heat-sensitive adhesive sheet when a switching signal is supplied. In this case, the switching signal may be generated based on at least one of previously input control data, an operation of a switching mechanism provided in a path for the heat-sensitive adhesive sheet, and a result of detecting whether or not the heat-sensitive adhesive sheet is reversed, and supplied to the thermal head. Further, the switching mechanism may include a mechanical or optical sheet detection sensor provided to at least one of two insertion portions for guiding the heat-sensitive adhesive sheet to a position opposite to the thermal head.

It is preferable that the printing and thermal activation device for a heat-sensitive adhesive sheet further include a reversing mechanism provided closer to the thermal head and adapted to reverse the heat-sensitive adhesive sheet printed with the thermal head and sent out and to reguide the reversed heat-sensitive adhesive sheet to the position opposite to the thermal head. The reversing mechanism may include a reversing roller and a transporting roller for the heat-sensitive adhesive sheet provided rotatably in a forward direction and a reverse direction between the thermal head and the reversing roller, and the heat-sensitive adhesive sheet printed with the thermal head and sent out through forward rotation of the transporting roller may be transported by at least half of an outer periphery of the reversing roller to be reversed, and reguided to the thermal head through reverse rotation of the transporting roller. The printing and thermal activation device for a heat-sensitive adhesive sheet further includes a platen roller that is arranged opposite to the thermal head, is capable of forward rotation to transport the heat-sensitive adhesive sheet nipped between the platen roller and the thermal head from a side of the thermal head to a side of the reversing mechanism, and is capable of reverse rotation to transport the heat-sensitive adhesive sheet from the side of the reversing mechanism to the side of the thermal head. With this structure, the heat-sensitive adhesive sheet can be automatically reversed to enable automatic and continuous printing and thermal activation.

Also, the printing and thermal activation device for a heat-sensitive adhesive sheet may further include: supplying means for supplying the heat-sensitive adhesive sheet in the form of continuous paper; take-up means capable of taking up the heat-sensitive adhesive sheet in the form of continuous paper printed with the thermal head and resettable to reverse the heat-sensitive adhesive sheet; and a platen roller that is arranged opposite to the thermal head, is capable of forward rotation to transport the heat-sensitive adhesive sheet nipped between the platen roller and the thermal head from a side of the supplying means to a side of the take-up means, and is capable of reverse rotation to transport the heat-sensitive adhesive sheet from the side of the take-up means to the side of the supplying means. In this case, it is possible that the entire heat-sensitive adhesive sheet undergoes printing in advance and then thermal activation is carried out on the labels on a one-by-one basis at appropriate timings. Alternately, the labels may be subjected to printing one after another (cut off) and then thermal activation may be carried out on the labels on a one-by-one basis. In this way, the degree of freedom in a producing method for a sticker label is increased, enabling its applications according to requirements of a user.

A printing and thermal activation method for a heat-sensitive adhesive sheet according to the present invention includes the steps of: performing printing on a printable layer constituting one surface of the heat-sensitive adhesive sheet by causing the printable layer to abut against a thermal head; and thermally activating a heat-sensitive adhesive layer constituting the other surface of the heat-sensitive adhesive sheet by causing the heat-sensitive adhesive layer to abut against the thermal head.

The printing and thermal activation method for a heat-sensitive adhesive sheet may further include between the printing step and the thermally activating step, the step of reversing the heat-sensitive adhesive sheet printed with the thermal head and sent out and reguiding the reversed heat-sensitive adhesive sheet to a position opposite to the thermal head. In this case, the step of reversing the heat-sensitive adhesive sheet printed with the thermal head and sent out and reguiding the reversed heat-sensitive adhesive sheet to a position opposite to the thermal head may include reversing the heat-sensitive adhesive sheet printed with the thermal head and sent out through forward rotation of a transporting roller by transporting the heat-sensitive adhesive sheet by at least half of an outer periphery of a reversing roller, and reguiding the heat-sensitive adhesive sheet to the thermal head through reverse rotation of the transporting roller.

The printing and thermal activation method for a heat-sensitive adhesive sheet may further include the steps of: supplying the heat-sensitive adhesive sheet in the form of continuous paper prior to the printing step; taking up the heat-sensitive adhesive sheet in the form of continuous paper printed with the thermal head by take-up means; resetting the take-up means to reverse the heat-sensitive adhesive sheet; and resupplying the printed heat-sensitive adhesive sheet from the reset take-up means to the thermal head prior to the thermally activating step.

BRIEF DESCRIPTION OF THE DRAWINGS

In the accompanying drawings:

FIGS. 11A and 11B are schematic diagrams showing a printing and thermal activation device for a heat-sensitive adhesive sheet according to a fourth embodiment of the present invention;

FIGS. 14A to 14C are schematic diagrams showing a structural example of a thermal head of a printing and thermal activation device for a heat-sensitive adhesive sheet according to the present invention; and FIG. 15 is a schematic diagram showing a conventional printing and thermal activation device for a heat-sensitive adhesive sheet.

DETAILED DESCRIPTION OF THE PREFERRED EMBODIMENTS

Hereinafter, embodiments of the present invention will be described with reference to the accompanying drawings.

Figure 1A:
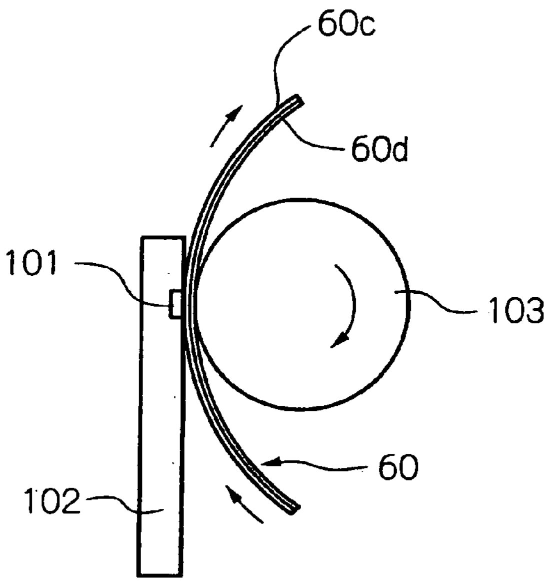
FIGS. 1A and 1B are schematic diagrams showing a printing and thermal activation device for a heat-sensitive adhesive sheet according to a first embodiment of the present invention.
Figure 1B:
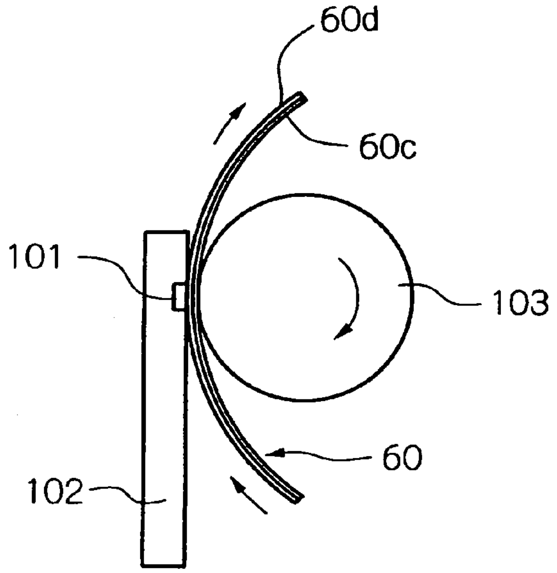
Figure 2:
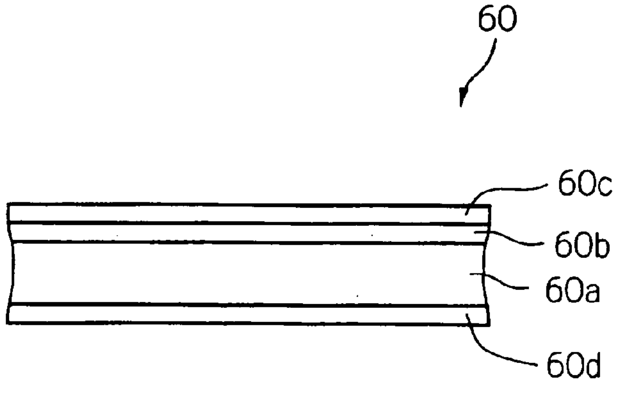
FIG. 2 is an enlarged view showing an example of a heat-sensitive adhesive sheet used in the present invention.

FIGS. 1A and 1B are schematic diagrams showing the most basic structure of a printing and thermal activation device for a heat-sensitive adhesive sheet 60 according to the present invention. As shown in FIG. 2, the heat-sensitive adhesive sheet 60 has, although not particularly limited to, a structure where a heat-insulating layer 60*b* and a heat-sensitive color-developing layer (printable layer) 60*c* are formed on a front side of a sheet base material 60*a* while a heat-sensitive adhesive is applied and dried to form a heat-sensitive adhesive layer 60*d* on its rear side. Note that the heat-sensitive adhesive layer 60*d* is formed with a heat-sensitive adhesive mainly containing a thermoplastic resin, a solid plastic resin, or the like. Further, the heat-sensitive adhesive sheet 60 may dispense with the heat-insulating layer 60*b* or have a protective layer or colored printed layer (preprinted layer) formed on the surface of the printable layer 60*c*.

The printing and thermal activation device shown in FIGS. 1A and 1B includes: a thermal head 102 having plural heater elements 101 composed of relatively small resistors arranged in a width direction so as to enable dot printing; and a platen roller 103 brought into pressure contact with the thermal head 102. The heater elements 101 have substantially the same structure as those of a print head of any known thermal printer where a protective film made of crystallized glass is formed on surfaces of plural heating resistive elements formed on a ceramic substrate by a thin film formation technique. Hence, its detailed description is omitted here.

Further, the printing and thermal activation device is provided with a drive system (not shown) including an electric motor and a gear train, for example, for rotating the platen roller 103. The platen roller 103 can be rotated by the drive system. Accordingly, the platen roller 103 is rotated in a state where the heat-sensitive adhesive sheet 60 is nipped between the thermal head 102 and the platen roller 103, so that the heat-sensitive adhesive sheet 60 is sent in a predetermined direction while its one surface is heated with the thermal head 102. In an example shown in FIGS. 1A and 1B, the platen roller 103 is rotated clockwise to thereby transport the heat-sensitive adhesive sheet 60 to an upper portion of FIGS. 1A and 1B. Also, the printing and thermal activation device is provided with pressurizing means (not shown) composed of a coil spring or leaf spring, for example. The pressurizing means presses the platen roller 103 against the thermal head 102. At this time, the rotation axis of the platen roller 103 and the arrangement direction of the heater elements 101 are kept in parallel, which makes it possible to uniformly bring the heat-sensitive adhesive sheet 60 throughout the width direction into pressure contact with the thermal head.

In this embodiment, in the printing and thermal activation device having such a structure, appropriately selecting which surface of the heat-sensitive adhesive sheet 60 comes into pressure contact with the thermal head 102 enables printing on the printable layer 60*c* of the heat-sensitive adhesive sheet 60 and thermal activation on the heat-sensitive adhesive layer 60*d* as desired. More specifically, as shown in FIG. 1A, the heat-sensitive adhesive sheet 60 is inserted so as to bring the printable layer 60*c* into pressure contact with the thermal head 102 and then printing is performed on the printable layer (heat-sensitive color-developing layer) 60*c* by the action of the heater elements 101 of the thermal head 102. The thermal head 102 has substantially the same structure as that of a print head of any general thermal printer, so that any characters, symbols, patterns, images, etc. can be printed with high quality. Note that in this specification, the term "printing" encompasses recording symbols, patterns, images, etc. without being limited to characters. At this time, the heat-sensitive adhesive layer 60*d* is not thermally activated.

Also, as shown in FIG. 1B, the heat-sensitive adhesive sheet 60 is inserted so as to bring the heat-sensitive adhesive layer 60*d* into pressure contact with the thermal head 102 and then the heat-sensitive adhesive layer 60*d* is thermally activated by the action of the heater elements 101 of the thermal head 102 to exhibit adhesion. In general, a large heat energy is required for thermally activating the heat-sensitive adhesive layer 60*d* as compared with printing on the printable layer (heat-sensitive color-developing layer) 60*c*. For example, the heat energy of the thermal head 102 is about 0.2 mJ during printing while being about 0.35 mJ during thermal activation. In examples of FIGS. 1A and 1B, the heat-sensitive adhesive sheet 60 may advance either upwards or downwards in FIGS. 1A and 1B. Also, the upward or downward advancing direction during printing may be reverse to that during thermal activation.

Figure 3A:
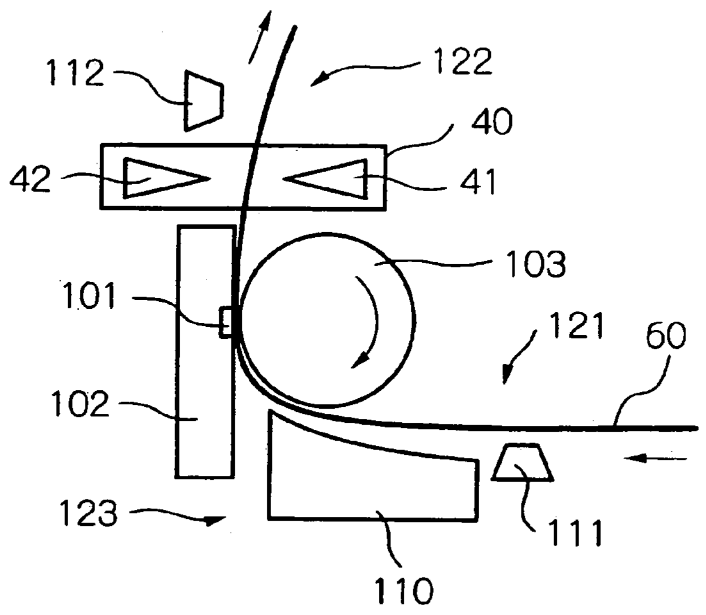
FIGS. 3A and 3B are schematic diagrams showing a printing and thermal activation device for a heat-sensitive adhesive sheet according to a second embodiment of the present invention.
Figure 3B:
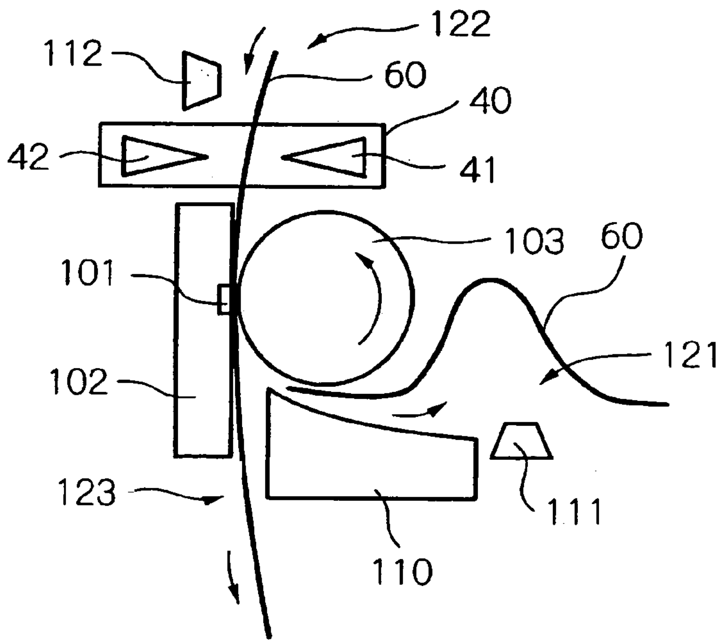

FIGS. 3A and 3B show a printing and thermal activation device for the heat-sensitive adhesive sheet 60 according to the present invention, which has an advanced structure compared with the basic structure shown in FIGS. 1A and 1B. The printing and thermal activation device includes in addition to the thermal head 102 and the platen roller 103 similar to those in FIGS. 1A and 1B: a guide frame 110; sensors 111 and 112 in pairs; and a cutter unit 40. A printing insertion portion 121 and a thermal activation insertion portion 122 are provided at crossing angle (in this embodiment, about 90 degrees) with the thermal head 102 and the platen roller 103 as the center as schematically shown in FIGS. 3A and 3B and the sensors 111 and 112 for detecting whether or not the heat-sensitive adhesive sheet 60 remains therein are arranged at the printing insertion portion 121 and the thermal activation insertion portion 122, respectively. In this embodiment, the guide frame 110 for guiding the heat-sensitive adhesive sheet 60 is arranged on the printing insertion portion 121 side and a gap portion (discharge portion) 123 through which at least the heat-sensitive adhesive sheet 60 can be inserted is provided between the guide frame 110 and the thermal head 102. Provided on the thermal activation insertion portion 122 side is the cutter unit 40 composed of a movable blade 41 capable of cutting the heat-sensitive adhesive sheet 60, which is driven by a drive source (not shown) such as an electric motor and a stationary blade 42 facing the movable blade 41. The cutter unit 40 has the same structure as that of the conventional example.

Figure 4:
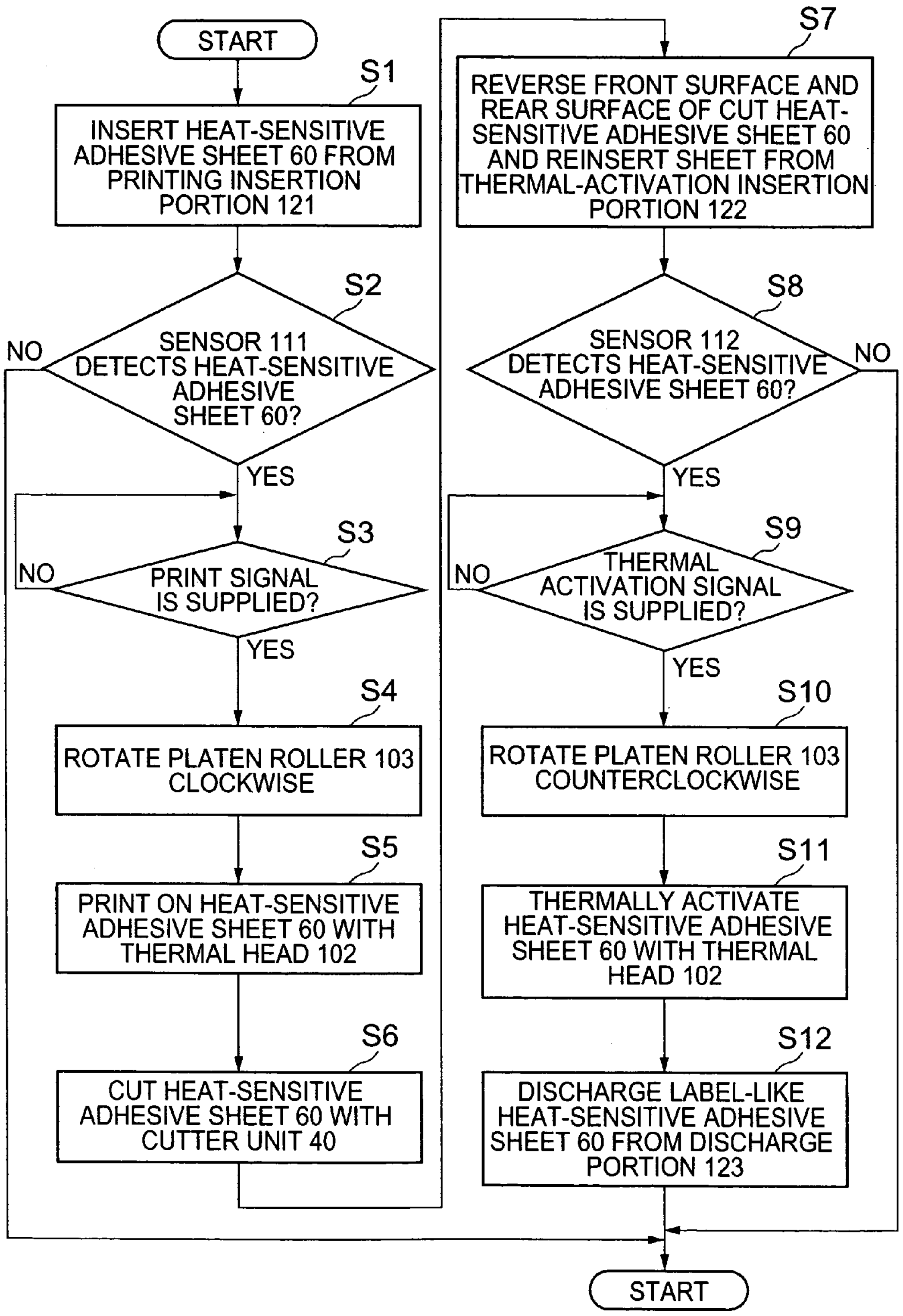
FIG. 4 is a flowchart of a printing and thermal activation method for a heat-sensitive adhesive sheet with the printing and thermal activation device of FIGS. 3A and 3B.

Referring to a flowchart of FIG. 4, a description will be made of a printing and thermal activation method for the heat-sensitive adhesive sheet 60 with the printing and thermal activation device shown in FIGS. 3A and 3B.

As shown in FIG. 3A, the heat-sensitive adhesive sheet 60 in the form of continuous paper is inserted through the printing insertion portion 121 so as to position the printable layer 60*c* (see FIG. 2) on the thermal head 102 side (step S1). Then, the sensor 111 detects the heat-sensitive adhesive sheet 60 (step S2) and in addition, control means generates print signals (step S3), after which the platen roller 103 rotates clockwise (step S4) and the heat-sensitive adhesive sheet 60 advances upwards in FIGS. 3A and 3B while being nipped between the thermal head 102 and the platen roller 103. At this point, the heater elements 101 of the thermal head 102 generate heat according to an appropriate pattern, and the printable layer 60*c* of the heat-sensitive adhesive sheet 60 undergoes recording of characters, symbols, etc. according to the print signal (step S5). Following this, after desired printing on a single sticker label is completed and the heat-sensitive adhesive sheet 60 is sent out, the cutter unit 40 cuts the heat-sensitive adhesive sheet 60 at an appropriate position (around the boundary between a printed portion and an unprinted portion) outside the thermal head 102 and the platen roller 103 (step S6).

The heat-sensitive adhesive sheet 60 thus printed and cut into a single sticker label size is reversed outside the thermal head 102 and the platen roller 103 and then reinserted through the thermal activation insertion portion 122 as shown in FIG. 3B (step S7). The sensor 112 detects the heat-sensitive adhesive sheet 60 (step S8) and in addition, the control means generates thermal activation signals (switching signals) (step S9), after which the platen roller 103 rotates counterclockwise (step S10), the heat-sensitive adhesive sheet 60 advances downwards of FIGS. 3A and 3B while being nipped between the thermal head 102 and the platen roller 103. At this time, since the heat-sensitive adhesive sheet 60 is reversed, the heat-sensitive adhesive layer 60*d* faces the thermal head 102. The heater element of the thermal head 102 entirely heats the layer with a larger heat energy than during printing. As a result, the heat-sensitive adhesive layer 60*d* of the heat-sensitive adhesive sheet 60 is entirely heated and thermally activated to thereby exhibit adhesion (step S11). The printed and thermally activated heat-sensitive adhesive sheet 60 in the form of a single label is discharged through the gap portion (discharge portion) 123 between the thermal head 102 and the guide frame 110 downwards in FIGS. 3A and 3B (step S12). On the other hand, the rest of the cut heat-sensitive adhesive sheet 60, which is left in the form of continuous paper is nipped between the thermal head 102 and the platen roller 103 at its leading edge but is retracted toward the printing insertion portion 121 in accordance with the counterclockwise rotation of the platen roller 103. Accordingly, at the time when the printed and thermally activated heat-sensitive adhesive sheet 60 in the form of a single label is discharged downwards of FIGS. 3A and 3B, the rest of the heat-sensitive adhesive sheet 60 is put into a standby state on the guide frame 110 so as to prepare for the next printing and thermal activation operation. A printing and thermal activation operation similar to the foregoing one is repeated to thereby produce the next adhesive sheet.

A more specific structural example of the above structure is shown in FIGS. 5 to 8. Note that substantially the same components as those described above are denoted by the same reference numerals and a description thereof is omitted here.

A printing and thermal activation device shown in FIGS. 5 to 8 includes similarly to the above structure of FIGS. 3A and 3B: the thermal head 102; the platen roller 103; the guide frame 110; and the sensors 111 and 112. The device further includes: another sensor (sensor 113) provided to the discharge portion 123; a roll housing unit 20 for holding and feeding the rolled heat-sensitive adhesive sheet 60, which is provided outside the printing insertion portion 121; and a reversing mechanism 130 provided outside the thermal activation insertion portion 122.

Here, the reversing mechanism 130 in this embodiment will be described. The reversing mechanism 130 is provided near the thermal activation insertion portion 122 and includes: a transporting roller pair (draw-in/discharge roller pair) 131 rotatable in both forward and reverse directions, and nip and transport the heat-sensitive adhesive sheet 60; a reversing roller 132; and plural driven rollers 133 arranged in abutment with an outer periphery of the reversing roller 132. Note that the rollers are referred to as the "driven rollers"; however, in practice, either the reversing roller 132 or the driven rollers 133 may be actively operated.

For smooth movement of the heat-sensitive adhesive sheet 60, a contact portion between the thermal head 102 and the platen roller 103, a gap between the movable blade 41 and the stationary blade 42, a contact portion of the transporting roller pair 131, and a center of the reversing roller 132 are arranged in substantially straight line. Also, a portion of the reversing roller 132 which faces the transporting roller pair 131 is provided with no driven roller 133 because the heat-sensitive adhesive sheet 60 is wound or wound off around/from the reversing roller 132, and may be provided with a guide member (not shown).

Figure 9:
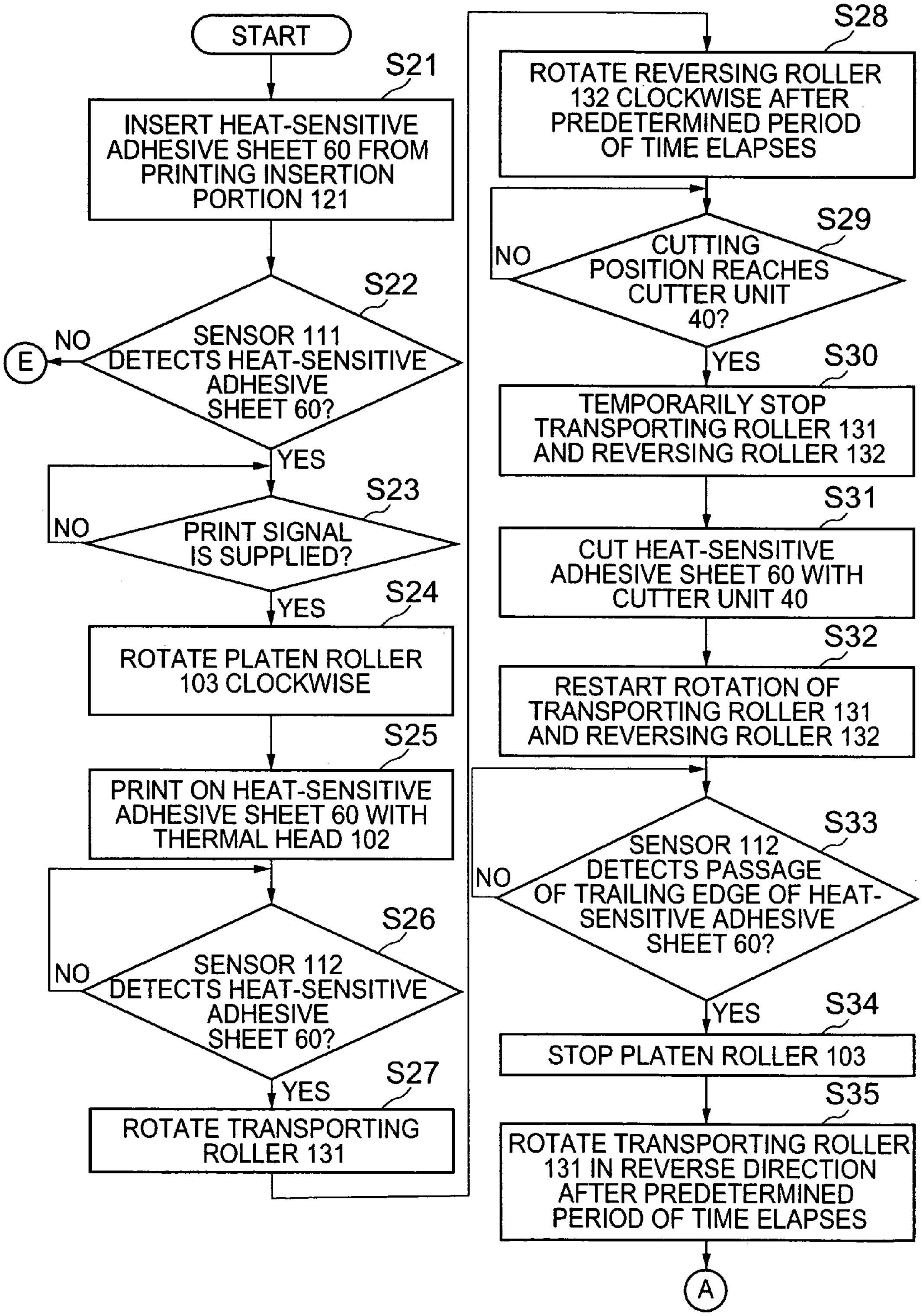
FIG. 9 is a flowchart of a printing and thermal activation method for a heat-sensitive adhesive sheet with the printing and thermal activation device of FIGS. 5 to 8.
Figure 10:
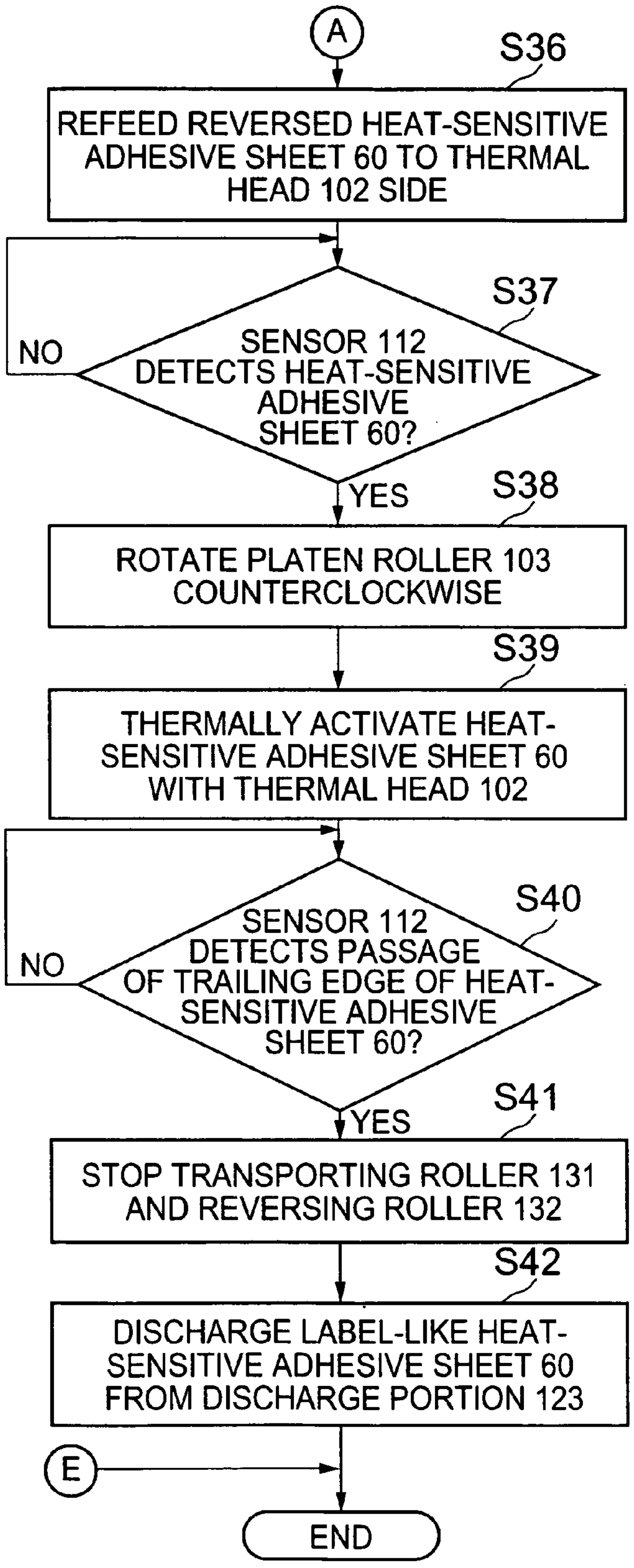
FIG. 10 is a flowchart of a printing and thermal activation method for a heat-sensitive adhesive sheet with the printing and thermal activation device of FIGS. 5 to 8.

Referring to flowcharts of FIGS. 9 and 10, a description will be given of a printing and thermal activation method for the heat-sensitive adhesive sheet 60 with the printing and thermal activation device.

First, the rolled heat-sensitive adhesive sheet 60 held in the roll housing unit 20 is wound off and inserted into the printing insertion portion 121 so as to position the printable layer 60*c* (see FIG. 2) on the thermal head 102 side (step S21). The sensor 111 detects the heat-sensitive adhesive sheet 60 (step S22) and print signals are generated (step S23), after which the platen roller 103 starts rotating clockwise (step S24) and the thermal head 102 concurrently starts operation according to an instruction of the print signal. At this time, the heat energy of the thermal head 102 is about 0.2 mJ. The heat-sensitive adhesive sheet 60 is nipped between the platen roller 103 and the thermal head 102 and moved while curling along the guide frame 110 and at the same time, predetermined printing is carried out on the printable layer 60*c* (step S25). When a leading edge of the heat-sensitive adhesive sheet 60 passes through the cutter unit 40 and the sensor 112 detects the sheet (step S26), the transporting roller pair 131 states rotating (step S27). After the elapse of a predetermined period of time, the reversing roller 132 starts rotating clockwise (step S28) and the driven rollers 133 accordingly start rotating counterclockwise. In this way, the leading edge of the heat-sensitive adhesive sheet 60 is guided to the reversing mechanism 130 while the heat-sensitive adhesive sheet 60 undergoes printing.

Figure 5:
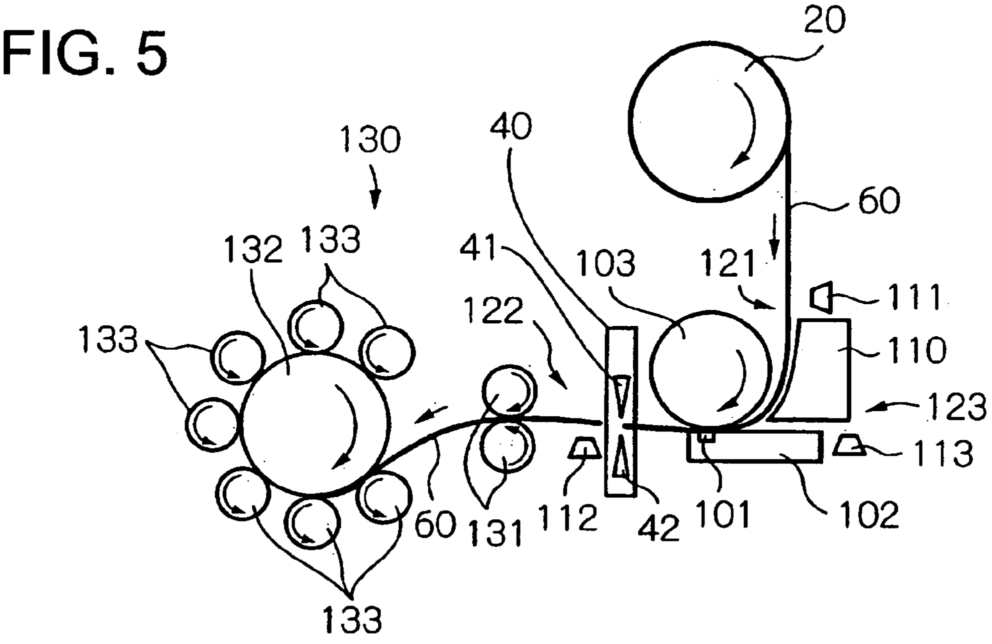
FIG. 5 is a schematic diagram showing a printing and thermal activation device for a heat-sensitive adhesive sheet according to a third embodiment of the present invention.

After desired printing on a single sticker label is completed and an appropriate cutting position (around the boundary between a printed portion and an unprinted portion) of the heat-sensitive adhesive sheet 60 reaches the cutter unit 40 (step S29), the transporting roller pair 131 and the reversing roller 132 (and the driven rollers 133) temporarily stop rotating (step S30) to temporarily suspend the movement of the heat-sensitive adhesive sheet 60. At this point, the cutter unit 40 cuts the heat-sensitive adhesive sheet 60 (step S31). Upon completion of the cutting operation, as shown in FIG. 5, the transporting roller pair 131 and the reversing roller 132 (and the driven rollers 133) restart rotating (step S32) to resume the movement of the heat-sensitive adhesive sheet 60. The heat-sensitive adhesive sheet 60 winds around the reversing roller 132 downstream of the transporting roller pair 131 and is rotated clockwise by the reversing roller 132 and the driven rollers 133.

Figure 6:
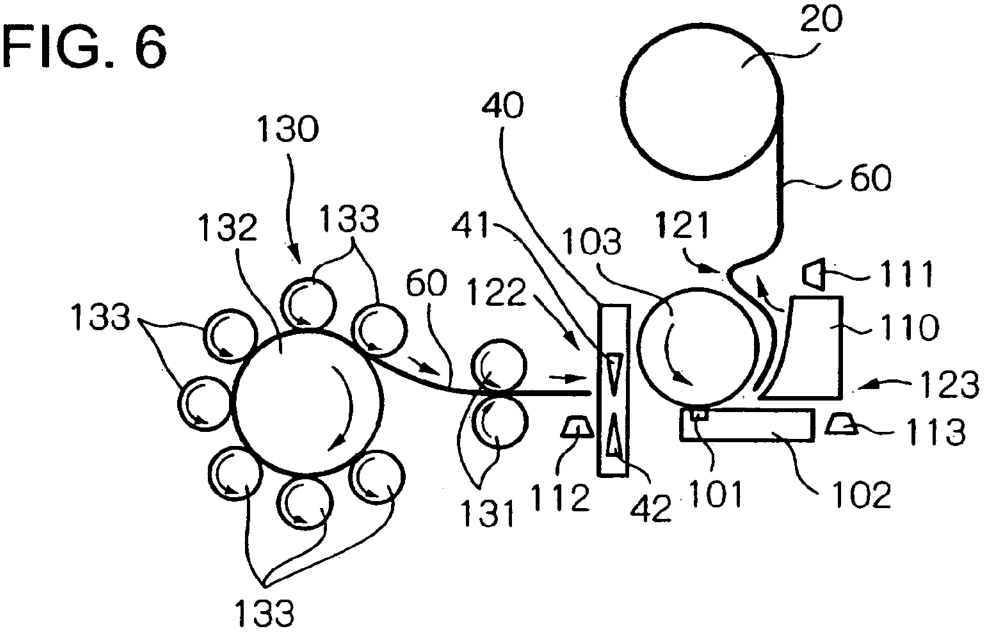
FIG. 6 is a schematic diagram showing a reversing step with the printing and thermal activation device of FIG. 5.

When a trailing edge of the heat-sensitive adhesive sheet 60 printed and cut into a label size passes through the sensor 112, the sensor 112 detects that no heat-sensitive adhesive sheet remains therein (step S33). Then, the platen roller 103 stops rotating (step S34) and the transporting roller pair 131 starts reverse rotation after the elapse of a predetermined period of time (after passage of the heat-sensitive adhesive sheet 60) (step S35). As shown in FIG. 6, the reversed heat-sensitive adhesive sheet 60 after making almost one rotation on the outer periphery of the reversing roller 132 is guided to the transporting roller pair 131 (between the rollers) by a guide member (not shown) and then refed to the thermal head 102 side (to the right in FIG. 6) in accordance the reverse rotation of the transporting roller pair 131 (step S36). When the sensor 112 detects the heat-sensitive adhesive sheet 60 (step S37), a switching signal is thereby generated, so that the platen roller 103 starts rotating counterclockwise (step S38). The counterclockwise rotation of the platen roller 103 retracts the rest of the heat-sensitive adhesive sheet 60 cut with the cutter unit 40, which is left in the form of continuous paper, toward the printing insertion portion 121 side along the guide frame 110. At this time, the retracted heat-sensitive adhesive sheet 60 may sag around the printing insertion portion 121 without being rewound by the roll housing unit 20; the heat-sensitive adhesive sheet 60 is held around the printing insertion portion 121 by its own tension. This eliminates the need to reinsert the heat-sensitive adhesive sheet 60 in the case where upon completion of thermal activation of the heat-sensitive adhesive sheet 60 in the form of a single label, a subsequent printing step is successively performed. Therefore, the steps of printing, cutting, and thermal activation can be continuously performed with ease, that is, a large number of sticker labels can be continuously produced with ease.

Figure 7:
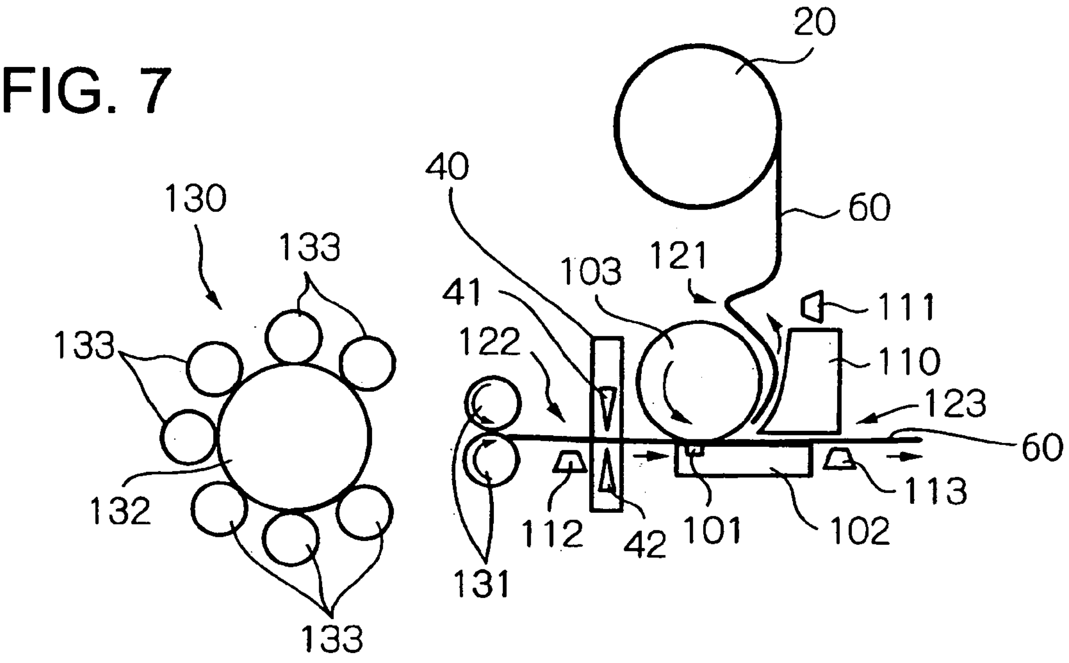
FIG. 7 is a schematic diagram showing a thermal activation step with the printing and thermal activation device of FIG. 5.
Figure 8:
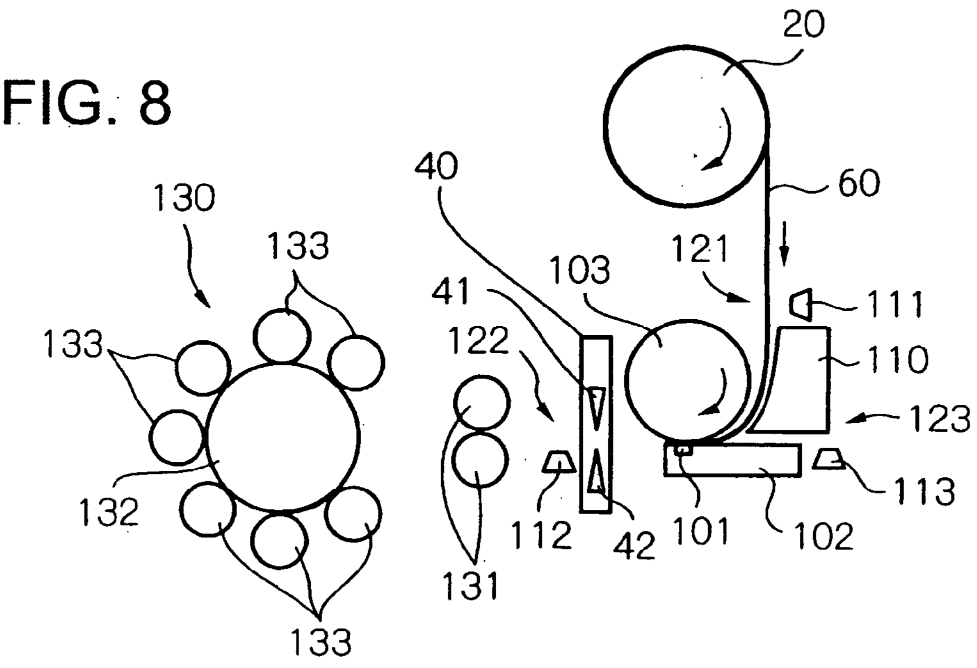
FIG. 8 is a schematic diagram showing a standby state of the printing and thermal activation device of FIG. 5 after completion of printing and thermal activation.

After the elapse of a predetermined period of time from when the platen roller 103 starts rotating counterclockwise, i.e., after the rest of the heat-sensitive adhesive sheet 60, which is left in the form of continuous paper as mentioned above is retracted and its leading edge leaves the thermal head 102, the thermal head 102 starts operation. At this time, the heat energy of the thermal head 102 is about 0.35 mJ, which is larger than during printing. As shown in FIG. 7, the heat-sensitive adhesive sheet 60 in the form of a single label passes through the cutter unit 40 at rest and moves while being nipped between the platen roller 103 and the thermal head 102 rotating counterclockwise to thereby thermally activate the heat-sensitive adhesive layer 60*d* (see FIG. 2) that abuts against the thermal head 102 since the sheet is reversed by the reversing mechanism 130 (step S39). After that, the heat-sensitive adhesive sheet 60 in the form of a single label is advancing straight forward, with receiving thermal activation, to the gap portion (discharge portion) 123 between the thermal head 102 and the guide frame 110 but not moving along the guide frame 110. The sensor 112 detects the passage of the trailing edge of the heat-sensitive adhesive sheet 60 in the form of a single label (step S40) and then the reversing roller 132 (and the driven rollers 133) and the transporting roller pair 131 stop rotating (step S41). Then, at the time when the trailing edge of the heat-sensitive adhesive sheet 60 in the form of a single label passes between the thermal head 102 and the platen roller 103 and leaves there after the completion of the thermal activation on the heat-sensitive adhesive sheet 60 in the form of a single label, the thermal head 102 and the platen roller 103 stop operation. Then, the heat-sensitive adhesive sheet 60 in the form of a single label after receiving predetermined necessary printing and thermal activation operations can be taken out from the gap portion (discharge portion) 123 between the thermal head 102 and the guide frame 110 (step S42). When the heat-sensitive adhesive sheet 60 in the form of a single label is taken out and the sensor 113 arranged to the discharge portion 123 detects that no heat-sensitive adhesive sheet 60 remains therein, as shown in FIG. 8, the device is ready for the next printing step for the heat-sensitive adhesive sheet 60. After the next print signal is input, printing and thermal activation processing can be successively performed skipping the insertion step S21.

Note that a size of the reversing roller 132, intervals between the platen roller 103, the transporting roller pair 131, and the reversing roller 132, a position of the cutter unit 40, etc. are appropriately set according to a length of a single label to be cut from the heat-sensitive adhesive sheet 60 and the transport speed of the heat-sensitive adhesive sheet. 60, for example. The reversing mechanism 130 is not limited to this system but may be realized with any other systems and is not particularly limited to this system.

Next, referring to FIGS. 11A to 12, another embodiment of the printing and thermal activation device according to the present invention will be described. Note that substantially the same components as those described above are denoted by the same reference numerals and a description thereof is omitted here.

The printing and thermal activation device shown in FIGS. 11A and 11B includes similarly to the above: the roll housing unit 20; the thermal head 102; the platen roller 103; and the cutter unit 40. The device further includes: a transporting roller pair 141 arranged upstream and downstream of the cutter unit 40 in the forward transporting direction and reverse transporting direction of the heat-sensitive adhesive sheet 60, respectively; a supporting roller pair 142 arranged downstream and upstream of the cutter unit 40 in the forward transporting direction and reverse transporting direction of the heat-sensitive adhesive sheet 60, respectively; and a guide unit 70. The transporting roller pair 141 and the supporting roller pair 142 can be rotated in forward and reverse directions as appropriate.

The guide unit 70 is composed of a plate-like guide (first guide) 71 provided between the cutter unit 40 and the transporting roller pair 141, and (second) guides 72 and 73 provided around its both ends face to face and bent upwards at substantially right angles. A portion between the second guides 72 and 73 is open and thus serves as a sheet storage portion where a predetermined length of the heat-sensitive adhesive sheet 60 can temporarily sag. Note that the second guides 72 and 73 may be constituted of one member whose upper portion is recessed as the sheet storage portion or may be changed in position with the first guide 71. In this case, the sheet storage portion is defined on a lower side with respect to the transporting direction. As mentioned below, the heat-sensitive adhesive sheet 60 sags during the thermal activation as a result of being guided to the guide unit 70 in such a manner that controls the rotation speed of the platen roller 103 and the transporting roller pair 141 and that of a take-up roller 143 and the supporting roller 142.

Figure 12:
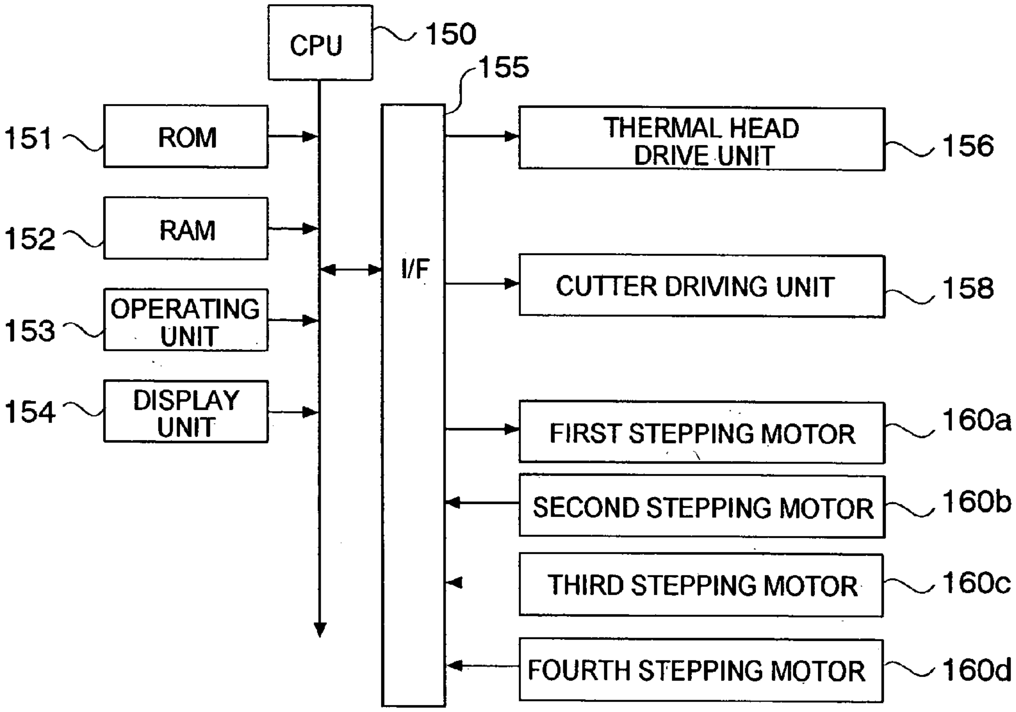
FIG. 12 is a control block diagram showing the printing and thermal activation device of FIGS. 11A and 11B.

FIG. 12 is a control block diagram of the printing and thermal activation device shown in FIGS. 11A and 11B. A control unit of the device includes: a CPU 150 as a control device for overall control of the control unit; a ROM 151 storing a control program etc. run by the CPU 150; a RAM 152 storing various print formats etc.; an operation unit 153 for inputting and setting, or calling print data or print format data; a display unit for displaying the print data etc.; an interface (I/F) 155 for exchanging (inputting/outputting) data between the control unit and drive units; a thermal head drive unit 156 for driving the thermal head 102; a cutter drive unit 158 for driving the movable blade 41 of the cutter unit 40 cutting the heat-sensitive adhesive sheet 60; and four stepping motors 160*a* to 160*d* for driving the platen roller 103, the transporting roller pair 141, the take-up roller 143, and the supporting roller pair 142, respectively, independently of one another.

The thermal head 102 carries out desired printing on the printable layer 60*c* or desired thermal activation on the heat-sensitive adhesive layer 60*d* based on a control signal transmitted from the CPU 150 and the cutter unit 40 performs the cutting operation at a predetermined timing. Also, the CUP 150 can independently transmit the control signal to the first stepping motor 160*a*, the second stepping motor 160*b*, the third stepping motor 160*c*, and the fourth stepping motor 160*d*. Thus, it is possible to independently control the rotation speed of the platen roller 103, the transporting roller pair 141, the supporting roller pair 142, and the take-up roller 143 driven by the stepping motors 160*a* to 160*d*, respectively, i.e., the transport speed of the heat-sensitive adhesive sheet 60. Note that the control unit of the printing and thermal activation device of the present invention is not limited to the structure of FIG. 12. For example, the control unit may be structured to have two or three stepping motors. In such a case, the following structures will be exemplified. That is, the platen roller 103 and the transporting roller pair 141 are driven with a single stepping motor, the take-up roller 143 and the supporting roller pair 142 are driven with a single stepping motor, or the take-up roller 143 serves as a driven roller, which does not have any drive source nor actively rotates.

Figure 13:
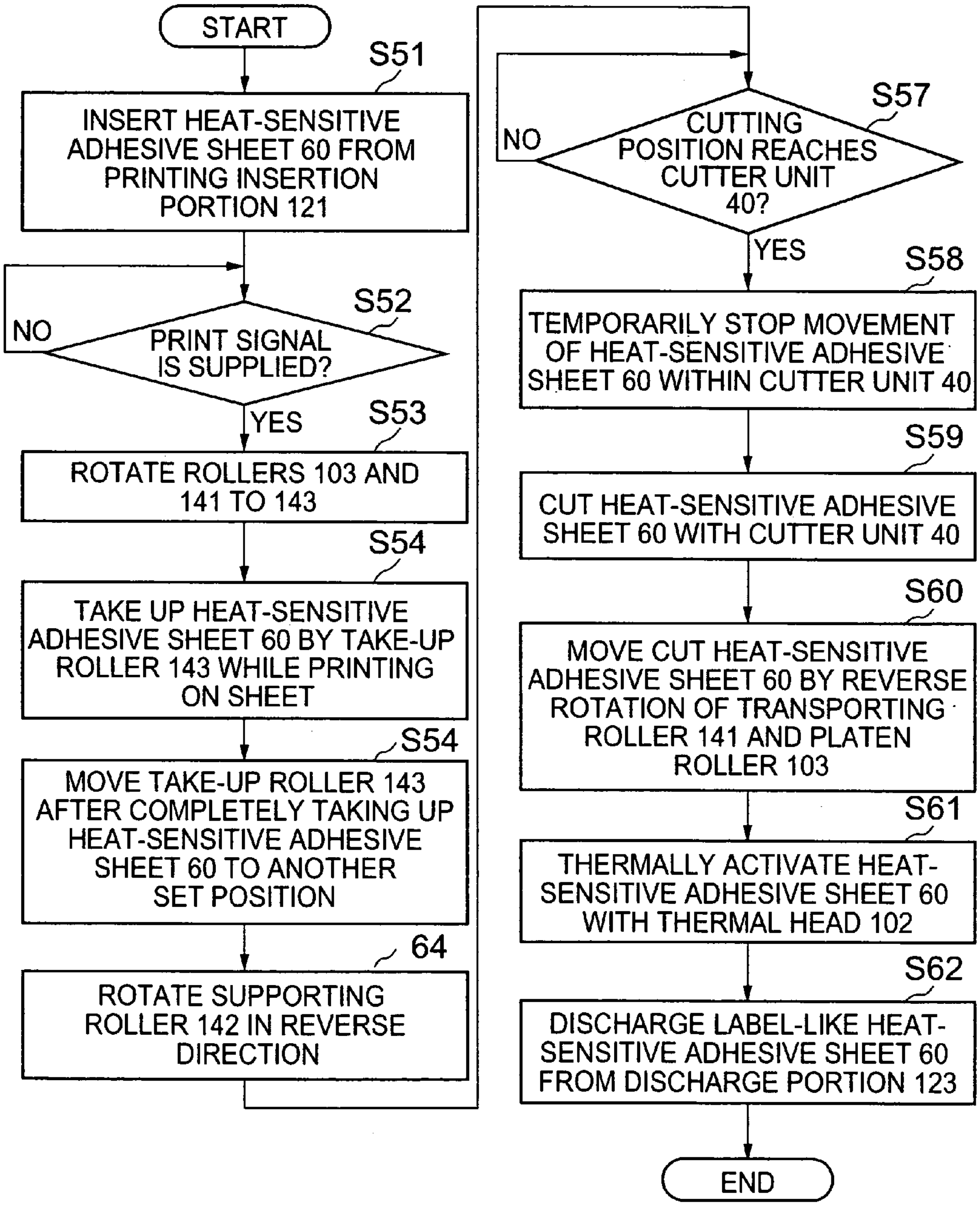
FIG. 13 is a flowchart of a printing and thermal activation method for a heat-sensitive adhesive sheet with the printing and thermal activation device of FIGS. 11A and 11B.

Referring to a flowchart of FIG. 13, a description will be given of a printing and thermal activation method for the heat-sensitive adhesive sheet 60 with the printing and thermal activation device.

First, the rolled heat-sensitive adhesive sheet 60 is wound off from the roll housing unit 20 and inserted into the printing insertion portion 121 so as to position the printable layer 60*c* (see FIG. 2) on the thermal head 102 side (step S51). Then, when the print signal is supplied (step S52), the platen roller 103 starts rotating clockwise. The thermal head 102 concurrently starts operation according to an instruction of the print signal. At this time, the heat energy of the thermal head 102 is about 0.2 mJ. The heat-sensitive adhesive sheet 60 passes between the thermal head 102 and the platen roller 103, through the transporting roller pair 141 (between the rollers), between the movable blade 41 and the stationary blade 42 of the cutter unit 40 at rest, and through the supporting roller pair 142 (between the rollers) and is secured in position to the take-up roller 143 at its leading edge. The platen roller 103 and the transporting roller pair 141, and the supporting roller pair 142 and the take-up roller 143 respectively rotate at substantially the same rotation speed (step S53) Accordingly, as shown in FIG. 11A, the heat-sensitive adhesive sheet 60 is taken up by the take-up roller 143 while the printable layer 60*c* receives predetermined printing with the thermal head 102 (step S54).

After the entire heat-sensitive adhesive sheet 60 is printed and taken up by the take-up roller 143, the take-up roller 143 is moved to another set position in a lower portion of FIG. 11B (step S55). This set position is symmetric to a set position at the time of during as shown in FIG. 11A with respect to a transport path of the heat-sensitive adhesive sheet 60. Therefore, the heat-sensitive adhesive sheet 60 is reversed with respect to the sheet at the time of printing. Then, the supporting roller pair 142 rotates in a reverse direction (step S56) and the heat-sensitive adhesive sheet 60 enters the cutter unit 40. When the heat-sensitive adhesive sheet 60 with a desired length corresponding to a single sticker label passes through the cutter unit 40 and its appropriate cutting position reaches the cutter unit 40 (step S57), the movement of the heat-sensitive adhesive sheet 60 is temporarily suspended within the cutter unit 40 (step S58) and the heat-sensitive adhesive sheet 60 is cut with the cutter unit 40 (step S59). The cut heat-sensitive adhesive sheet 60 in the form of a single label is transported in abutment with the thermal head 102 through the reverse rotation of the transporting roller pair 141 and the platen roller 103 (step S60). Note that the movement of only the heat-sensitive adhesive sheet 60 within the cutter unit 40 is suspended in step S58, and the heat-sensitive adhesive sheet 60 continues moving through the reverse rotation of the transporting roller pair 141 and the platen roller 103 on the thermal head 102 side. For that purpose, the supporting roller pair 142, the transporting roller pair 141, and the platen roller 103 are different in rotation speed as will be described later.

As discussed above, the heat-sensitive adhesive sheet 60 is reversed and thus the heat-sensitive adhesive layer 60*d* abuts against the thermal head 102 while the heat-sensitive adhesive sheet 60 is moving, and is applied with the heat energy of about 0.35 mJ from the thermal head 102 and thermally activated (step S61). The heat-sensitive adhesive sheet 60 in the form of a single label after predetermined necessary printing and thermal activation leaves the thermal head 102 and the platen roller 103 and is discharged (step S62).

In this embodiment, thermal activation is performed on the heat-sensitive adhesive sheet 60 cut into a desired length each corresponding to a single sticker label in this way. Hence, the rest of the cut heat-sensitive adhesive sheet 60, which is left in the form of continuous paper is nipped with the supporting roller pair 142 provided in front of the cutter unit 40 (in the left of FIGS. 11A and 11B) and held lest the rest should fall from the cutter unit 40. Accordingly, each time cutting and thermal activation of the heat-sensitive adhesive sheet 60 in the form of a single label are completed, the succeeding heat-sensitive adhesive sheet 60 can be inserted in succession into the cutter unit 40, enabling continuous cutting and thermal activation.

In this embodiment, during printing as shown in FIG. 11A, the heat-sensitive adhesive sheet 60 is transported and taken up such that the printable layer 60*c* thereof is positioned on the thermal head 102 side and printed. Meanwhile, during thermal activation as shown in FIG. 11B, the heat-sensitive adhesive sheet 60 is transported and rewound such that the heat-sensitive adhesive layer 60*d* thereof is positioned on the thermal head 102 side and thermally activated.

Incidentally, during the cutting operation on the heat-sensitive adhesive sheet 60 with the cutter unit 40 (step S59), the transport of the heat-sensitive adhesive sheet 60 should be temporarily stopped only for a period necessary for the movable blade 41 to move vertically (for example, 0.4 second)(step S58). Unless the heat-sensitive adhesive sheet 60 stops moving around at least the movable blade 41, the cutter unit 40 cannot accurately and smoothly cut the sheet.

Assuming that the entire heat-sensitive adhesive sheet 60 is stopped for cutting, the heat-sensitive adhesive sheet 60 is stopped in a state where a preceding portion of the sheet is nipped between the thermal head 102 and the platen roller 103. As a result, the heat-sensitive adhesive layer 60*d* exhibiting adhesion disadvantageously adheres to the thermal head 102 (heater elements 101) and the heat-sensitive adhesive sheet 60 is not smoothly transported even after the transport is resumed, leading to so-called paper jam or a transport failure. Also, the heat from the heater elements 101 may be transferred up to the printable layer 60*c* of the heat-sensitive adhesive sheet 60 to induce color development. In such a case, even if the heat-sensitive adhesive sheet 60 is discharged, the sheet is not good to look at and thus is off from practical use. Also, if the layer firmly adheres thereto, the operation of the entire device should be temporarily stopped for maintenance in some cases.

In light of the above problems, in this embodiment, the supporting roller pair 142 and the transporting roller pair 141 are made different in rotation speed, by which the heat-sensitive adhesive sheet 60 sags between the cutter unit 40 and the transporting roller pair 141 such that the heat-sensitive adhesive sheet 60 stops moving within the cutter unit 40 but does not stop moving in a position opposite to the thermal head 102 in the cutting step S59. A description will be given below focusing on this respect.

In this embodiment, when feeding the taken-up heat-sensitive adhesive sheet 60 back to the thermal head 102 side, the transport speed of the heat-sensitive adhesive sheet 60 transported through the rotation of the platen roller 103 and the transporting roller pair 141 is set lower than that of the heat-sensitive adhesive sheet 60 transported through the rotation of the take-up roller 143 and the supporting roller pair 142.

To elaborate, from the time when the leading edge of the heat-sensitive adhesive sheet 60 wound off from the take-up roller 143 reaches the transporting roller pair 141 (enters between the rollers) forward, the heat-sensitive adhesive sheet 60 is moved at the lower transport speed on a downstream side of the transporting roller pair 141 in the transporting direction and at the higher transport speed on an upstream side of the supporting roller pair 142. The difference in speed produces a surplus of the heat-sensitive adhesive sheet 60 between the supporting roller pair 142 and the transporting roller pair 141. When guided to the guide unit 70, the heat-sensitive adhesive sheet 60 slacks upwards. When in a slacked state, the predetermined cutting position reaches the cutter unit 40, the movement of the heat-sensitive adhesive sheet 60 is temporarily suspended within the cutter unit 40 by temporarily stopping the take-up roller 143 and the supporting roller pair 142 (step S58) and the heat-sensitive adhesive sheet 60 is cut with the cutter unit 40 (step S59). At this time, the rotation of the platen roller 103 and the transporting roller pair 141 is not stopped, and hence the leading edge side of the heat-sensitive adhesive sheet 60 keeps on moving. The movement acts to eliminate the slack between the supporting roller pair 142 and the transporting roller pair 141 but not applying extra tension to the heat-sensitive adhesive sheet 60 within the cutter unit 40. Accordingly, in this embodiment, the cutter unit 40 can accurately and smoothly cut the heat-sensitive adhesive sheet 60 without suspending the movement of the heat-sensitive adhesive sheet 60 in a portion abutting against the thermal head 102, which makes it possible to prevent such a situation that the heat-sensitive adhesive layer 60*d* of the heat-sensitive adhesive sheet 60 adheres to the thermal head 102 (heater elements 101), leading to paper jam or transport failure.

Note that the take-up roller 143 and the supporting roller pair 142 are set so as to resume rotation at appropriate timings such that upon completion of the cutting operation of the cutter unit 40, the preceding heat-sensitive adhesive sheet 60 cut into a label size is thermally activated and after the sheet has passed at least through the transporting roller pair 141 (between the rollers), a leading edge of the rest of the cut heat-sensitive adhesive sheet 60 enters the transporting roller pair 141 (between the rollers).

Also, the slack amount is determined according to a desired length of the adhesive label or a size of each component of the device. The differences in rotation speed between the platen roller 103 and the transporting roller pair 141 and between the take-up roller 143 and the supporting roller pair 142 are set through calculation so as to obtain appropriate slack amount. To give an example, the transport speed of the heat-sensitive adhesive sheet 60 through the rotation of the platen roller 103 and the transporting roller pair 141 is equal to that during printing as shown in FIG. 11A, i.e., about 150 mm/sec. The transport speed of the heat-sensitive adhesive sheet 60 through the rotation of the take-up roller 143 and the supporting roller pair 142 is set to about 100 mm/sec. This is suitable for obtaining heat energy necessary for the thermal head 102 upon printing and thermal activation.

Although not shown, various sensors may be arranged around the supporting roller pair 142, the cutter unit 40, and the transporting roller pair 141 in order to determine timings for starting and stopping rotation of the platen roller 103, the transporting roller pair 141, the supporting roller pair 142, and the take-up roller 143. In this case, those sensors are connected to the CPU 150 etc. via the interface 155.

The thermal head 102 used in the above embodiments generally has a structure where the heater elements 101 are positioned at an edge of a substrate for easy production and arranged somewhat obliquely. Accordingly, in a structure where the heat-sensitive adhesive sheet 60 may abut against the thermal head 102 in the forward and reverse directions, during printing, for example, as shown in FIG. 14A, when the heat-sensitive adhesive sheet 60 is inserted from the right to the left in FIG. 14A, the substrate surface of the thermal head 102 functions as a sheet insertion guide, and thus the heat-sensitive adhesive sheet 60 is nipped through the rotation of the platen roller 103 and smoothly inserted. However, during thermal activation, for example, as shown in FIG. 14B, when the heat-sensitive adhesive sheet 60 is inserted in a reverse direction (from the left to the right in FIG. 14B), the thermal head 102 has little portion serving as the sheet insertion guide. As a result, the heat-sensitive adhesive sheet 60 is hardly nipped through the reverse rotation of the platen roller 103. To that end, as shown in FIG. 14C, an insertion guide 104 is provided to an end portion of the thermal head 102 on the heater element 101 side, which improves insertion property and movement property of the heat-sensitive adhesive sheet 60. As a method of providing the insertion guide 104, another member may be separately provided to the end portion of the thermal head 102, the member being continuous with the heater element surface of the thermal head 102 and open with respect to the insertion direction of the heat-sensitive adhesive sheet 60. Also, the thermal head 102 is designed such that the heater elements 101 are arranged at an inner position from the end portion of the thermal head 102 to secure a wide region capable of functioning as the insertion guide on the substrate edge, in other words, to integrally form the insertion guide. The thermal head 102 of such a structure may be used.

In the above embodiments, the heat energy of the thermal head 102 may be different between during the printing operation and during the thermal activation operation by the thermal head 102 and further the rotation direction or speed maybe different between the rollers. The printing operation and the thermal activation operation are switched according to the switching signals. The switching signals are generated at appropriate timings based on the control data (mode selection signal, output form selection signal, etc.) previously input with a keyboard etc. of the operation unit 153 shown in FIG. 12, generated by manually operating a change-over switch provided to the operation unit 153, generated according to operations of a switching mechanism inclusive of various sensors (sensors 111, 112, and 113) provided in a transport path of the heat-sensitive adhesive sheet 60, or generated based on a result of detecting whether or not the heat-sensitive adhesive sheet 60 is reversed. Note that whether or not the heat-sensitive adhesive sheet 60 is reversed can be detected by detecting with an optical sensor that may be included in the sensors 111, 112, and 113, a color difference between the front surface and the rear surface (i.e., the printable layer 60*c* and the heat-sensitive adhesive layer 60*d*) of the heat-sensitive adhesive sheet 60, a difference in reflectivity, presence/absence of an identification mark (black mark), and a difference in position, shape, and pattern of the identification mark, for example.

As has been set forth above, according to the present invention, it is unnecessary to separately provide the printing unit and the thermal activation unit unlike the conventional ones, whereby the entire device can be made compact and lightweight. Also, the number of expensive thermal heads can be reduced, leading to cost reduction. In addition, the transporting means attains more simplified structure as the number of constituent units reduces. The control for synchronizing the operations of each constituent unit and the transporting means can be made simple as compared with conventional ones.

According to the present invention, the thermal head comes into contact with the heat-sensitive adhesive sheet to thereby enable direct heat transfer and efficient thermal activation. Further, the thermal head can generate heat only during energization for thermal activation, whereby the energy consumption for thermal activation can be saved.

Also, the thermal head is used alternately for printing and thermal activation on the heat-sensitive adhesive sheet, whereby the adhesive residue adhering to the thermal head surface upon thermal activation is wiped off by the heat-sensitive adhesive sheet upon printing, in other words, automatically cleaned off, resulting in simple maintenance.

Alternatively, the entire heat-sensitive adhesive sheet is subjected to only printing and then thermally activated, whereby so-called batch-labeling that means printing on a large amount of adhesive labels is performed in advance and the labels are collectively affixed thereafter can be realized. At this time, the step of cutting the sheet into a small label may be carried out just before or after printing.

What is claimed is:

1. A printing and thermal activation device for a heat-sensitive adhesive sheet, comprising a thermal head capable of printing on a printable layer constituting one surface of the heat-sensitive adhesive sheet by abutting against the printable layer and capable of thermal activation for a heat-sensitive adhesive layer constituting the other surface of the heat-sensitive adhesive sheet by abutting against the heat-sensitive adhesive layer.

2. A printing and thermal activation device for a heat-sensitive adhesive sheet according to claim 1, wherein the thermal head switches between a printing operation and a thermal activation operation for the heat-sensitive adhesive sheet when a switching signal is supplied.

3. A printing and thermal activation device for a heat-sensitive adhesive sheet according to claim 2, wherein the switching signal is generated based on at least one of previously input control data, an operation of a switching mechanism provided in a path for the heat-sensitive adhesive sheet, and a result of detecting whether or not the heat-sensitive adhesive sheet is reversed and is supplied to the thermal head.

4. A printing and thermal activation device for a heat-sensitive adhesive sheet according to claim 3, wherein the switching mechanism includes a mechanical or optical sheet detection sensor provided to at least one of two insertion portions for guiding the heat-sensitive adhesive sheet to a position opposite to the thermal head.

5. A printing and thermal activation device for a heat-sensitive adhesive sheet according to claim 1, further comprising a reversing mechanism provided closer to the thermal head and adapted to reverse the heat-sensitive adhesive sheet printed with the thermal head and sent out and to reguide the reversed heat-sensitive adhesive sheet to the position opposite to the thermal head.

6. A printing and thermal activation device for a heat-sensitive adhesive sheet according to claim 5, wherein:

the reversing mechanism includes a reversing roller and a transporting roller for the heat-sensitive adhesive sheet provided rotatably in a forward direction and a reverse direction between the thermal head and the reversing roller; and the heat-sensitive adhesive sheet printed with the thermal head and sent out through forward rotation of the transporting roller is transported by at least half of an outer periphery of the reversing roller to be reversed, and reguided to the thermal head through reverse rotation of the transporting roller.

7. A printing and thermal activation device for a heat-sensitive adhesive sheet according to claim 5, further comprising a platen roller that is arranged opposite to the thermal head, is capable of forward rotation to transport the heat-sensitive adhesive sheet nipped between the platen roller and the thermal head from a side of the thermal head to a side of the reversing mechanism, and is capable of reverse rotation to transport the heat-sensitive adhesive sheet from the side of the reversing mechanism to the side of the thermal head.

8. A printing and thermal activation device for a heat-sensitive adhesive sheet according to claim 1, further comprising:

supplying means for supplying the heat-sensitive adhesive sheet in the form of continuous paper;

take-up means capable of taking up the heat-sensitive adhesive sheet in the form of continuous paper printed with the thermal head and resettable to reverse the heat-sensitive adhesive sheet; and a platen roller that is arranged opposite to the thermal head, is capable of forward rotation to transport the heat-sensitive adhesive sheet nipped between the platen roller and the thermal head from a side of the supplying means to a side of the take-up means, and is capable of reverse rotation to transport the heat-sensitive adhesive sheet from the side of the take-up means to the side of the supplying means.

9. A printing and thermal activation method for a heat-sensitive adhesive sheet, comprising the, steps of:

performing printing on a printable layer constituting one surface of the heat-sensitive adhesive sheet by causing the printable layer to abut against a thermal head; and thermally activating a heat-sensitive adhesive layer constituting the other surface of the heat-sensitive adhesive sheet by causing the heat-sensitive adhesive layer to abut against the thermal head.

10. A printing and thermal activation method for a heat-sensitive adhesive sheet according to claim 9, further comprising between the printing step and the thermally activating step, the step of reversing the heat-sensitive adhesive sheet printed with the thermal head and sent out and reguiding the reversed heat-sensitive adhesive sheet to a position opposite to the thermal head.

11. A printing and thermal activation method for a heat-sensitive adhesive sheet according to claim 10, wherein the step of reversing the heat-sensitive adhesive sheet printed with the thermal head and sent out and reguiding the reversed heat-sensitive adhesive sheet to a position opposite to the thermal head comprises reversing the heat-sensitive adhesive sheet printed with the thermal head and sent out through forward rotation of a transporting roller by transporting the heat-sensitive adhesive sheet by at least half of an outer periphery of a reversing roller, and reguiding the heat-sensitive adhesive sheet to the thermal head through reverse rotation of the transporting roller.

12. A printing and thermal activation method for a heat-sensitive adhesive sheet according to claim 9, further comprising the steps of:

supplying the heat-sensitive adhesive sheet in the form of continuous paper prior to the printing step;

taking up the heat-sensitive adhesive sheet in the form of continuous paper printed with the thermal head by take-up means;

resetting the take-up means to reverse the heat-sensitive adhesive sheet; and resupplying the printed heat-sensitive adhesive sheet from the reset take-up means to the thermal head prior to the thermally activating step.

* * * * *